C. B. STEELE.
CONVERTIBLE ROLLING CHAIR.
APPLICATION FILED DEC. 16, 1919.
1,393,461.
Patented Oct. 11, 1921.
5 SHEETS—SHEET 1.
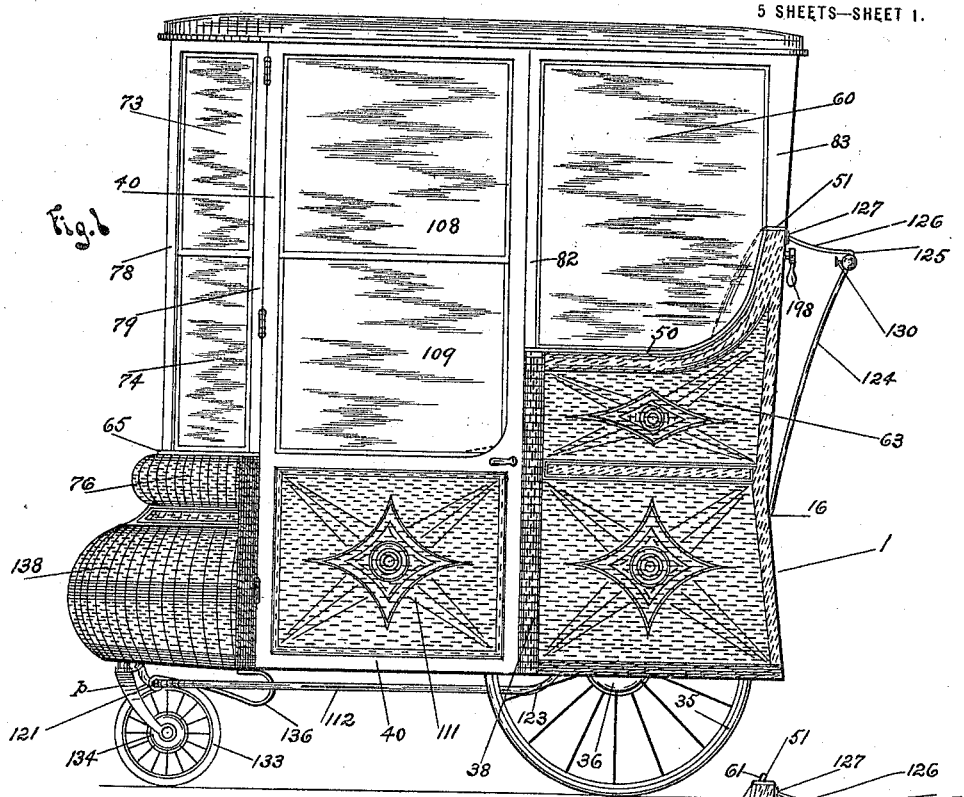
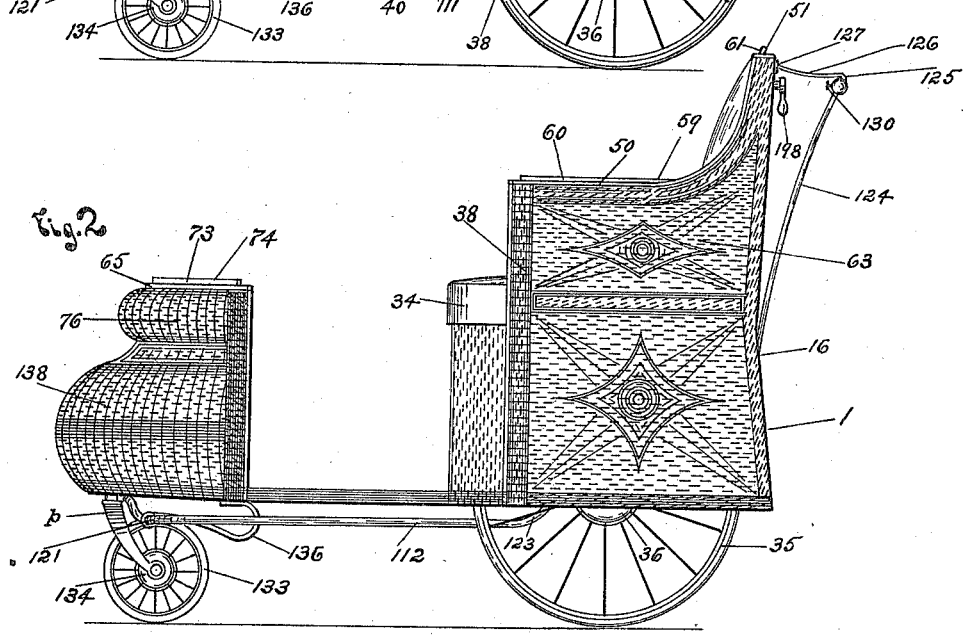

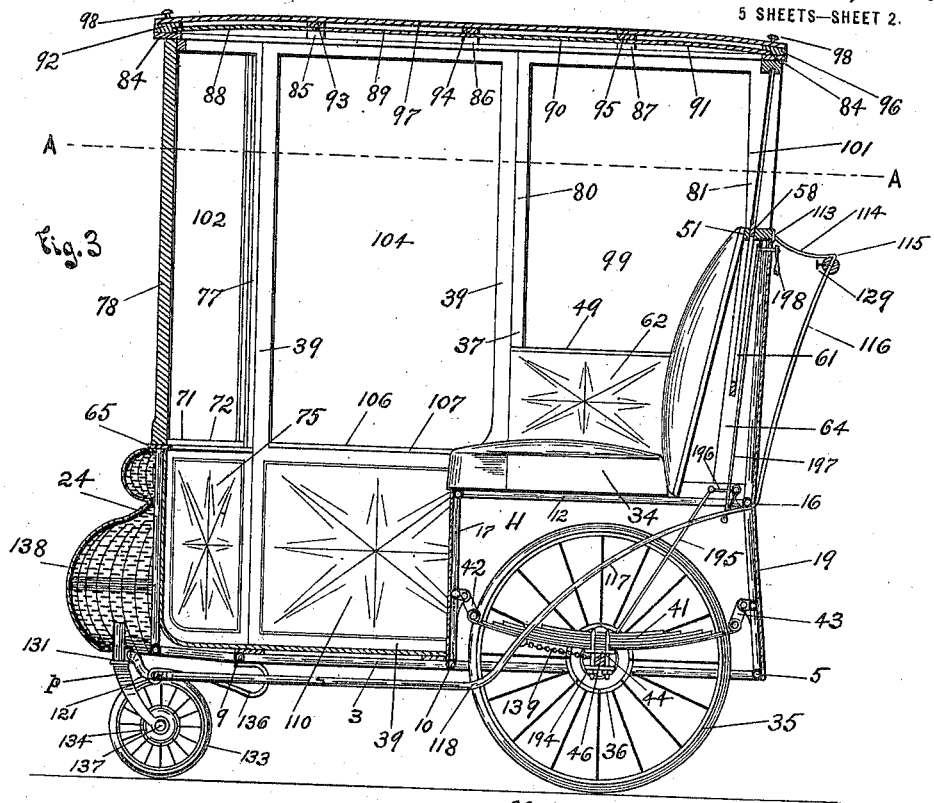

C. B. STEELE.
CONVERTIBLE ROLLING CHAIR.
APPLICATION FILED DEC. 16, 1919.
1,393,461.
Patented Oct. 11, 1921.
5 SHEETS—SHEET 3.
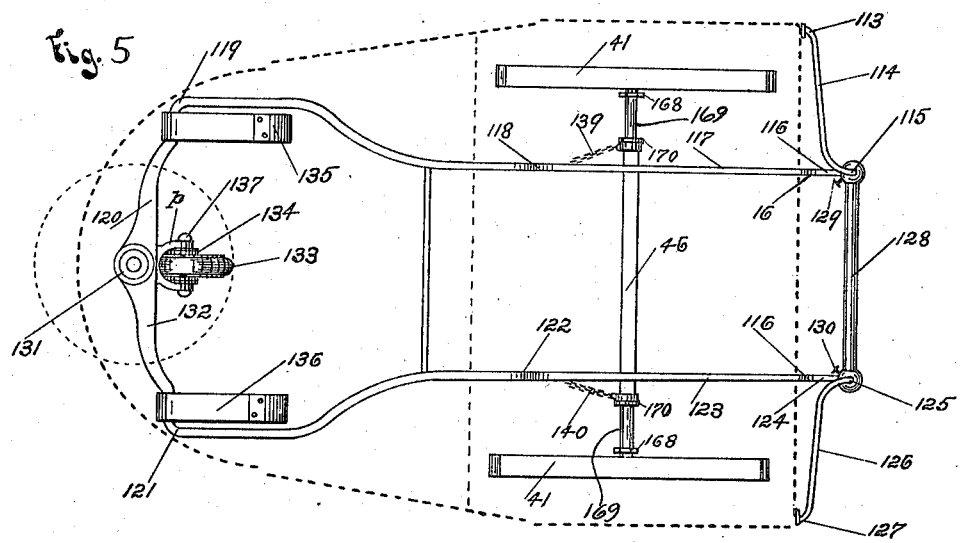
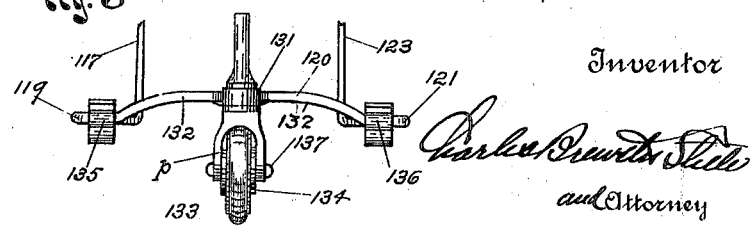

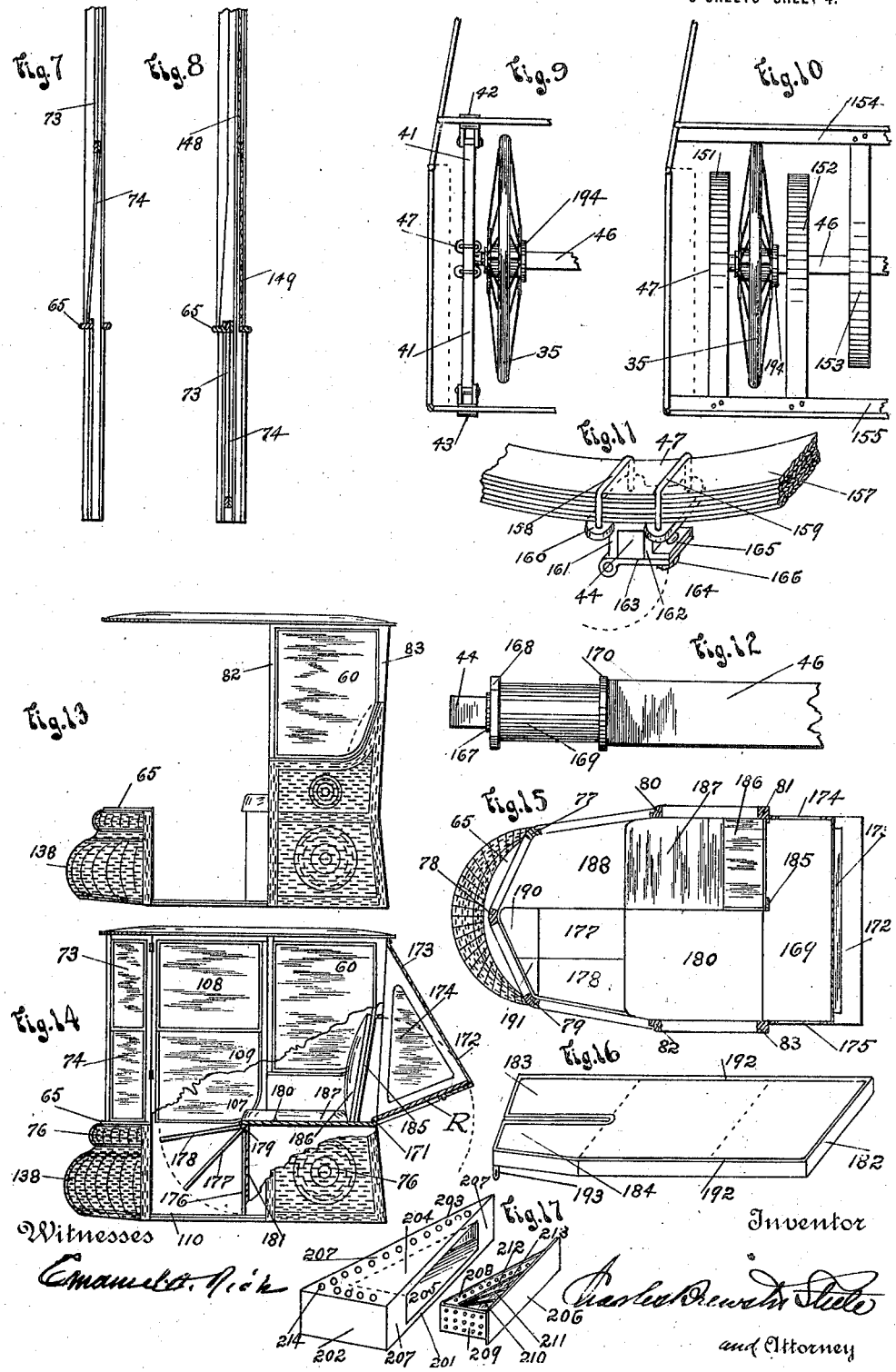

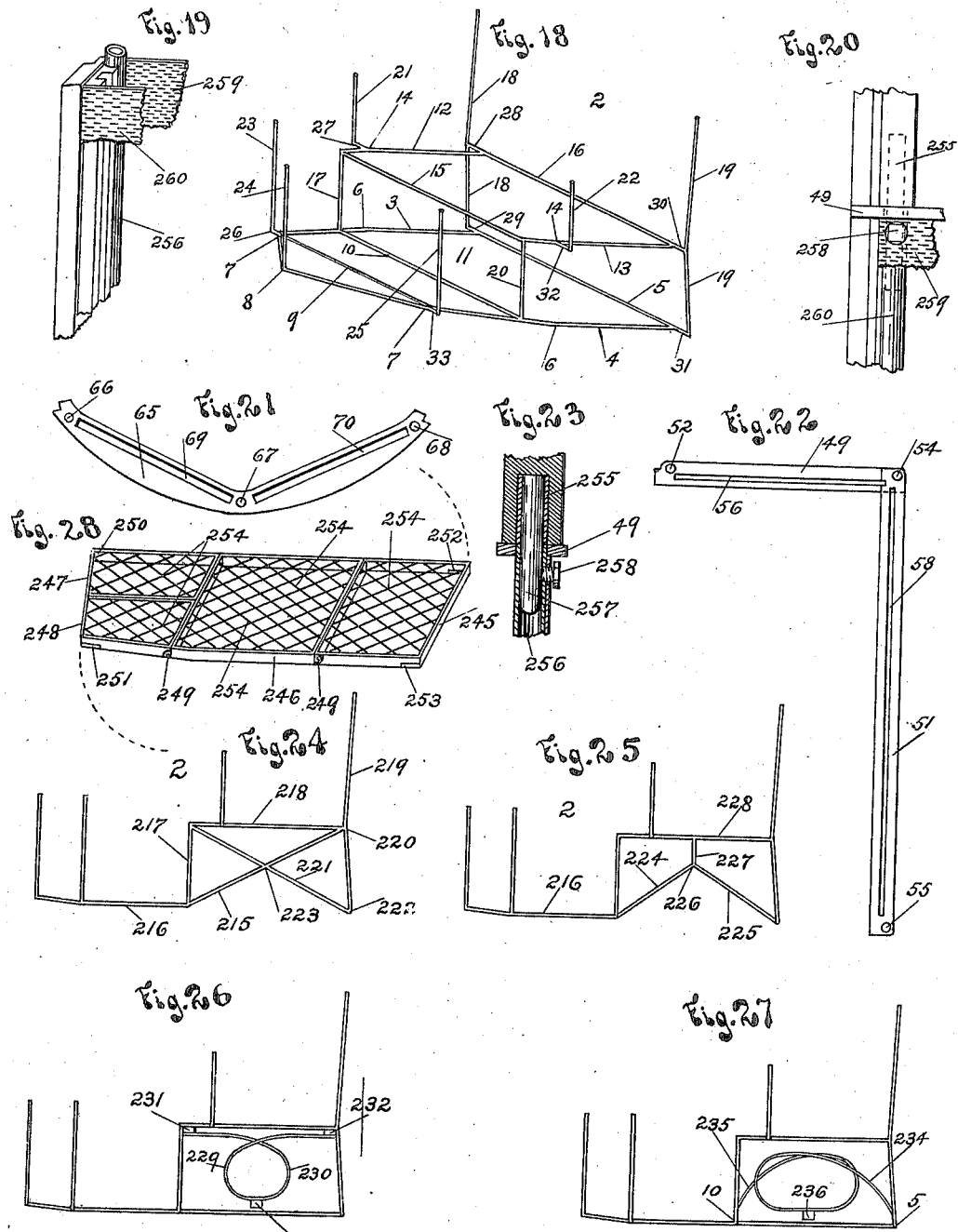

UNITED STATES PATENT OFFICE.

CHARLES BREWSTER STEELE, OF PHILADELPHIA, PENNSYLVANIA.

CONVERTIBLE ROLLING CHAIR.

1,393,461.　　　　　　Specification of Letters Patent.　　Patented Oct. 11, 1921.

Application filed December 16, 1919. Serial No. 345,368.

*To all whom it may concern:*

Be it known that I, CHARLES BREWSTER STEELE, a citizen of the United States, residing at Philadelphia, in the county of Philadelphia and State of Pennsylvania, have invented new and useful Improvements in Convertible Rolling Chairs, of which the following is a specification.

My invention is a convertible rolling-chair comprising inherent means of instant, convenient, easy, and labor-saving conversion, reconversion, and transformation, vice versa, to and from a completely closed weather sealed condition, into a completely open air penetrating state, or an entirely exposed topless vehicle, each of its variety of different converted forms constituting an intrinsically complete type in itself; one and the same conveyance, thus providing means of continuous maintenance and operation, and delivery of universal service for any and every hour and day of the year, during all seasons, sudden changes of temperature, and climatic conditions, thereby insuring riders comfort and protection in cold and inclement weather, and enjoyment of an open rolling-chair having air circulation therethrough during clement, pleasant, and hot periods.

Another object of my invention consists in the instant convertibility of the vehicle to and from a completely closed into a completely open condition at any moment and period of operation while on a trip, or journey, so that, should it be operating, for instance, as an open vehicle, and a sudden storm arose, it can be immediately, expeditiously, and conveniently reconverted into a closed storm proof vehicle, permitting perfect vision therefrom in all directions, and if the storm abates, or subsides, can be as instantly reconverted, vice versa, into an open vehicle again, without disturbing or incommoding passengers, or interfering with the service, operation, or schedule.

Another object of my invention consists in the window openings, sash, and pockets constituting ingredient constituents of the regular rolling-chair structure; always in operative position, condition, and readiness for instant use.

Another object of my invention is the provision of closable-unclosable sash operative in the window-openings, the mere raising or lowering of which, instantly converts or reconverts the vehicle to and from a completely closed or a completely open rolling chair.

Another object of my invention is the provision of sash-pockets beneath all the window-openings within which the window sash become accommodatingly housed when in lowered position.

Another object of my invention consists in the construction of doors of expansively increased width for the facilitation of comfortable and easy ingress and egress of passengers, provided with window openings, sash, and housing pockets therein of the same approximate dimensions of those within the frontal body framing.

Another object of my invention consists in constructing the dash approximately the height of the seat-rests, and providing sash pockets therein, thereby affording extensive window openings and area of vision and expanse of air circulating space frontward of the seat.

Another object of my invention consists in extending the seat front beyond the door-jambs, thereby providing an increased expanse of space beneath the seat for the accommodation of large diametered traction wheels that enable the vehicle to be "pushed" and propelled with greatly diminished expenditure of energy and exertion, add to the strength and resiliency of spring suspension, enhance riding qualities, and facilitate comfortable entrance and departure of passengers.

Another object of my invention consists in plural roofing structure, whereby the outside opaque storm proof roof-lid is detachable, exposing the transparent ceiling thereby converting the vehicle into a weather sealed conveyance having a transparent roof, thus affording invalids, convalescents, or pleasure riders the luxury of a sunshine flooded "cold" and "wind" excluded vehicle with the benefits derived from a moving "sun bath" through the roofing, and the added diversions of transportation and change of locality and scene.

Another object of my invention consists in protecting passengers from the discomfort and annoyance of mosquitos, and other insects, by means of screens, that shield window and door openings and permit free vision and circulation of air therethrough, and are movable into the closure pockets from the openings upon disappearance of such pests.

Another object of my invention consists in "three point" construction of the frontal framing, the planes of the front window structure diverging from their central meeting point, forming a triangular wind shield having declining streamlines, thereby diminishing wind pressure resistance, lessening exertion of the "pusher" during tempestuous weather, and giving expansive bifarious range of vision.

Another object of my invention consists in the body and seat underframe, having a continuous plan structure on lines of three point and transverse angularity, that enables the use of minimum weight and quantity of material, with maximum sustaining and resisting strength, upright members of the underframe forming pocket and doorway division posts, upon which the attachable-detachable top-frame structure is supported and lockingly secured.

Another object of my invention consists in the compound chassis-guide-frame-push-handle, formed in membranous continuosity, curved to permit its securement adjacent the back window sills and seat frame, the swivel-guide-wheel and springs being secured to the front thereof, a pulling-link connecting it with the rear wheels axle, and its "push-handle" adjustable to any desired position to suit the height and arm reach of a "pusher."

Another object of my invention consists in constructing the pocket walls of the exterior and interior covering, in ornamental design, to form protective barriers, isolating springs, auxiliaries, and traction-wheels from contact with pedestrians.

Another object of my invention consists in the detachable-attachable upper structure, and instantaneous conversion of my closable-unclosable vehicle into an entirely exposed, topless, wide open rolling-chair, retaining only the body, seat, and dash for "summer" use during fair, clement, pleasant, and hot weather, by the mere removal of the doors and the detachable-portable upper and top frame structure from above the window sills, as fabricated and provided for quick and convenient disassociation therewith.

Another object of my invention consists in equilibration of body resilient poise by the disposition of the spring-tread proximate the body side-outlines outside of and beyond the traction-wheel-tread, the adjustable axle-spring-fixtures, enabling removal of the traction-wheels, for lubrication, or other purposes, without detachment of the springs.

Another object of my invention consists in providing the swingable-back; the tri-part separable leg-rests and mattress, and the nurses back-rest and half-seat-cushion, whereby the bodies and limbs of invalids may repose in any desired reclining position within one side of the vehicle body, while accompanied by a nurse, or attendant, occupying the adjacent seat.

Another object of my invention consists in providing the vehicle with self-generated heat for the comfort of occupants during periods of low temperatures, by means of the "isolated" safety heat plant, as an integral or detachable structure, consuming a dry, flameless, and gasless fuel.

Figure 1 is a side elevation of the fully assembled preferred form of my rolling-chair, with the top-framing and doors in operative position, elongated window openings, extensible from the roofing to the pockets, closed by the transparent sash, constituting the completely weather sealed storm proof rolling-chair.

Fig. 2 is a side elevation of Fig. 1, showing the vehicle transformed into an entirely exposed, topless, wide open rolling-chair, by the window sash being dropped into the pockets, and the doors and upper structure removed.

Fig. 3 is a sectional elevation, cut on line B—B of Fig. 4, of the fully assembled preferred form, showing all the windows completely open with the sash housed in the pockets, the opaque storm proof roof, the transparent wind-proof "sun bath" ceiling, the continuous piping body and seat underframe, window frame and pocket uprights, interior and exterior wall coverings, seat, cushion, and armrests, the extra enlarged diametered traction wheels, the front and rear spring suspension, and the compound chassis-push frame having its after left side broken away, interposing axle pull cables, and the adjustable propelling-guide handle, and the brake-safety-appliances provided with the brake-control in proximate adjacence thereto.

Fig. 4 is a sectional plan, projection of Fig. 3, cut on line A—A thereof, showing the interior and exterior pocket walls, the window uprights, and sash therebetween in raised position, the floor, seat, back rest, the compound chassis - push - frame - adjustable propelling guide-handle, and safety heat-plant - footstool, with its grating broken away.

Fig. 5 is a plan of the compound chassis-guide - frame - adjustable - push handle, constructed in membraneous continuosity, from its attachment at one side of the body to its ending at the opposite side thereof, showing the arched wheel-port, swivel-joint, enlarged swivel front traction-wheel, front spring suspension, and adjustable push - handle; dotted lines indicating the body outlines.

Fig. 6 is a front elevation of Fig. 5, showing the arched wheel-port of the chassis-frame, permitting complete orbital movement of the swivel-guide-traction-wheel therewithin, front spring-suspension, and the push-handle extensions broken away.

Fig. 7 is a fragmentary vertical section of the front lower and upper framing structure, showing a window-opening closed by transparent sash, sash-housing pocket and runway extending therewithin.

Fig. 8 is a fragmentary vertical section of the same structure and projection of Fig. 7, showing a window opening and runways, transparent sash housed in the pocket, the window-sill, and the insect-excluding protective screens shielding the window-openings adapted to be housed in the pockets.

Fig. 9 is a fragmentary top plan of the underframe, showing the rear axle with a traction-wheel thereon, semi-elliptical spring suspension with their spring-tread outside of and beyond the traction-wheel-tread, and attached by the adjustably attachable-detachable spring-clamp upon the clamp-seat projecting from the outer end of the axle, and a brake applied to the traction-wheel.

Fig. 10 is a fragmentary top plan of the underframe, projection of Fig. 9, showing a form of band spring suspension secured to transverse cleats and the adjustable spring-clamp, and attached by the clamp to the projecting clamp-seat on the outer end of the axle, outermost of the series of springs having their spring-tread outside of and beyond the traction-wheel-tread, with a brake applied to the traction-wheel.

Fig. 11 is a fragmentary perspective of the adjustably attachable-detachable spring-clamp secured to a spring, and attached to the projecting clamp-seat on the outer end of the axle, showing the clamp locking jaw, bolt and lock-nut.

Fig. 12 is a fragmentary plan of an axle, showing the traction-wheel spindle, screw-threaded wheel-tap, and the outer projecting clamp-seat to and upon which the spring is attached by the adjustable attachable spring-clamp.

Fig. 13 is a side elevation of a body, showing the doors and front framing removed, the sash housed in the dash-pockets, the side and rear sash in raised position, and the roofing retained.

Fig. 14 is a plan of a body, with part of its side and a door broken away, showing the hinged reclining back, the seat-rest, the seat riser, and the "lighted" triangular rear cover, in section, with each of the tri-part sectors of the adjustable leg-rests poised in separated positions, and the "attendant's" half-seat cushion shown in side-elevation.

Fig. 15 is a sectional plan of the body, projection of Fig. 14, with part of the upright structure broken away, showing the reclining back, the "lighted" curtain cover, the seat-rest, the seat-rest-back, two sectors of the tripart adjustable leg-rests occupying one half of the body interior, the other half of the body interior being occupied by the "attendant's" half-seat-back and half-seat cushion, with the third sector adjustable leg-rest folded against the seat-riser.

Fig. 16 is a plan of the vehicle half-body mattress, showing its dual leg-rest divisions flexibly conformable with two of the tripart leg-rest sectors.

Fig. 17 is a perspective of the "isolated" heat-plant, showing its asbestos protected tray-chamber, the slidable fuel-tray withdrawn therefrom, the outlining hot-air conduit with perforated top, and the compartments of the fuel-tray filled with the fuel-briquets.

Fig. 18 is a perspective of the preferred form of the body-underframe, constructed in integral continuity, showing the enlarged rectangle formed by the seat, side, and rear members for accommodating the extra enlarged diametered traction-wheels and correspondingly accompanying spring suspension, its three-point bracing frontal contour, and offset-sash-housing pocket and door-stanchion-uprights.

Fig. 19 is a fragmentary perspective, showing a side sash housing pocket offset upright, a sash runway and door jamb secured thereto, and pocket-walls formed of plated India reed.

Fig. 20 is a fragmentary elevational projection of Fig. 19 showing a pocket-offset upright crowned by a window-sill, with lower sectors of a runway, a door-jamb, and pocket walls, and upper sectors of the runway and door-jamb of the attachable-detachable upper structure in locked position upon a window-sill.

Fig. 21 is a plan of the compound three-point frame-brace front window-sill, showing the tri-apertures therein that overfit and clasp the underframe dash-uprights, and conformably produce a three-point body-truss, and sash-slots.

Fig. 22 is a plan of a side and rear window-sill, showing the sash-slots and apertures that fit and clasp over the underframe uprights, forming a four-point body-truss.

Fig. 23 is a fragmentary section showing a method of locking upper structure with an underframe upright, by means of a dowel-pin within the tubing secured by a set-screw.

Fig. 24 is a side elevation of the underframe, showing modified construction of the traction-wheels rectangle for additional space for removing traction-wheels.

Fig. 25 is a side elevation of the underframe, showing another modification to facilitate removal of traction-wheels.

Fig. 26 is a side elevation of the underframe, showing the enlarged rectangle with a type of spring suspension therewithin.

Fig. 27 is a side elevation of the underframe, showing another modification of spring suspension within the enlarged traction-wheel rectangle.

Fig. 28 discloses a perspective plan view of the body-back-head-leg-rest sectioned resiliently cushioned portable lounge, or bed-rest, provided with hinged lockable means permitting horizontal and reclinatory positioning of its sections, adapted to uphold its conformable mattress secured thereto, for supporting an invalid thereon during transference to and from the vehicle and while being transported in the rolling chair.

The numeral, 1, represents the body of the preferred form of my rolling-chair, erected upon and around the underframe, 2, perspectively illustrated in Fig. 18, fabricated of members in bent, or jointed, continuity, preferably of galvanized piping, its various longitudinal, transverse, diagonal, and upright sectors being either connected by T couplings, or welded into an integrally continuous structure. Side sills, 3, and 4, extend from the rear end sill, 5, to the points, 6, then converge on similar planes to the points, 7, from whence they decline to their central unition peak, 8, said sill structure being braced by the cross-members, 9, and 10; the members 5, and, 10, together with the rearward portions of the side sills, 3, and, 4, forming the hollow rectangle, 11. Similar longitudinal members, 12, and, 13, converge to the points, 14, and transverse members, 15, and, 16, upheld by the uprights, 17, 18, 19, and, 20, at a suitable distance thereabove, form the seat rest frame, upon which the seat cushion is supported. The uprights, 21, 22, 23, 24, and 25 form divisional structure of the windows and doorways and the three point frontal framing, the extension-arms, 26, 27, 28, 29, 30, 31, 32, and 33, offsetting the uprights, 18, 19, 21, 22, 23, and 25, from the seat framing and sill structure, and provide the pocket-spaces therewithin that form the window sash housings. The continuosity of this underframe from extremity to extremity, having its longitudinal, transverse, and upright members forming and additionally functioning braces and trusses, constitutes a load sustaining structure of maximum strength and rigidity to resist strain and stress, with the employment of minimum quantity and weight of materials, while the enlarged quadrangular space, 11, provided beneath the seat-rest, 34, furnishes economic accommodation and isolation of extra large diametered traction-wheels, 35, having enlarged ball-bearing-hubs, 36, without encroachment upon passenger carrying space and capacity, nor increase of overall dimensions. The seat structure, 34, directly positioned above the rectangle, 11, is, thus, also, enabled to project forward of the door-jambs 37, and, 38, the expansive doorways and the extra wide doors, 39, and, 40, thereby providing additional width of ingress and egress passageway, facilitating entrance and emergence of passengers, and an extensive increase in floor, limb, foot, and seat area, without exceeding practical standard outline dimensions.

Semi-elliptical springs, 41, preferably, suspended closely proximate the sides of the body, are secured endwise thereto by the shackles, 42, and, 43, and centrally attached to and upon the clamp-seats, 44, and, 45, projecting from the extremities of the axle, 46, by the adjustably attachable-detachable spring-clamps, 47, and, 48, as detailed, for instance, in Figs. 3, 5, 9, and, 11, thereby enabling convenient and expeditious removal of the traction-wheels, for lubrication, or other purposes, without disconnecting the springs from the vehicle; the herein disclosed principle of constructing the "spring-tread" outside of and beyond the traction "wheel-tread", obtaining maximum cushioning equilibration of the body, and practical elimination of the objectionable body tilting and swaying of three-wheeled vehicles; two springs, thus located closely proximate the vehicle side outlines, delivering better resilient supportable results, than spring suspension heretofore employing three or more spring units.

Compound side and rear window-sills, 49, 50, and 51, having orifices, 52, 53, 54, and, 55, at each end thereof, fit over, span, and clasp the uprights, 18, 19, 21, and, 22, to one another, the apertures, 56, 57, and, 58, permitting the sash, 59, 60, and, 61, to pass into and out of the sash-housing-pockets 62, 63, and, 64. The frontal underframe uprights, 23, 24, and, 25, are surmounted by the V shaped window-sill, 65, whose orifices, 66, 67, and, 68, similarly fit over, and clasp said uprights to one another, and performs the additional function of a "three-point" trussing brace, the apertures, 69, and 70, permitting the sash, 71, 72, 73, and, 74, to pass within and without the sash-housing-pockets, 75, and, 76; thus, the underframe uprights and window-sills form a very strong and rigid body and pocket superstructure, and perform the additional and important function of providing maximum resistive strength throughout the belt-line region.

The attachable-detachable upright structure that forms the window framing, and upholds the roofing, is preferably, constructed in complementary units, for expeditious assembly, disassembly, and storage, the front window-and-sash-runway posts, 77, 78, and, 79, forming one unit structure, the runway post structure, 80, and, 81, forming another unit, and the runway post structure, 82, and, 83, forming another additional unit. This post structure registers with the sash runways of the housing pockets, and is rigidly securable to and with the body structure by locking devices registering with the upright-tubes of the underframe, such, for instance, as shown in Figs. 21, 22, and, 25, or any other suitable securing and locking means.

The doors, 39, and, 40, have window-openings, 104, and, 105, of a protracted depth the same at that of the front window-openings, 102, and, 103, and are provided with sash, 106, 107, 108, and, 109, movably operative within and without the pockets, 110, and, 111, the doors being hung on hinges that permit their removal when swung, approximately, 180 degrees. Thus superior extensive expanse of window-opening width and depth is attained in every direction surrounding the seat with light and air circulation, the extra breadth and depth of the front and door window-openings providing maximum extent of frontal and bilateral range of vision.

The integrally continuous chassis-adjustable-handle push-frame, 112, shown in Figs. 1, 2, 3, 5, and, 6, beginning at its fastening point, 113, adjacent the rear window sill, 51, extends by its arm, 114, to its elbow, 115, its downwardly extending branch, 116, to fixture with the underframe at 16, from whence its curvature, 117, extends to its elbow, 118, thence expandingly extending to the elbow, 119, its transverse front sector, 120, crossing to the point, 121, and thence returning in similar manner with like curves, elbows, branch and arm, 122, 123, 124, 125, 126, to its duplicate fastening point, 127. The push-handle, 128, is movably adjustable to any desirable height on the branches, 116, and, 124, and its location secured by set screws, 129, and, 130, or other suitable means, the "push-handle", 128, thus accommodating the grasp and arm reach of "pushers" of different "stature" the entire chassis-push-frame being graduated in proportionate dimensions for its plurality of operative requirements, the transverse front sector, 120, being relatively enlarged, shaped, and strengthened to carry an extra large ball-bearing swivel joint, 131, its arched wheel post, 132, permitting free pivotal revolution thereunder of the extra large diametered swivel guiding front traction-wheel, 133, provided with the extra sized ball-bearing hub, 134, for properly supporting the frontal body load. The springs, 135, and, 136, attached, respectively to the chassis and body, and interposed therebetween, form means of spring suspension, closely adjacent the front outlines of the underframe, attaining a maximum degree of frontal equilibrial poise and body balance to a three wheeled vehicle, the swivel axle, 137, of the swivel guiding wheel, 133, acting as the fulcrum for the compound resilient leverage of the vehicle body and rearward attachment thereto of the chassis-push-frame during depression and recoil of the rear springs, the hollow rounding exterior ornamental dash, 138, affording leverage scope for the swivel-joint-prong $p$.

Oscillating pull-links, 139, and, 140, connect the chassis-push-frame, 112, to the rear axle, 46, and exercise a direct pull thereon, and may be made of any suitable type, such as flexible metal cables, bars having swivel joints, or otherwise formed. The pushing-power emanating from the push-handle, 128, thus exerts a pulling force upon the traction-wheels, the equalization of the "pull" distributed through all the "pull" coefficient points of the chassis, eliminating strain from the power exerted in propulsion, and attains the important result of preventing body "over-reach" stress, common of heretofore types of rods and handles exerting power directly against the body, and dragging the traction-wheels through the spring suspension, but any type of chassis-push-framing comprising, coöperating with, or utilizing longitudinal, diagonal, three-point, or other forms of spring suspension, or pushing means having integral continuity from push-handle to attachment with frontal traction-wheels, may be employed without departing from the broad principle of my invention.

Adjustable screens, excluding mosquitos, or other insects, and permitting free vision and circulation of air therethrough, 148 and 149, such, for instance, as disclosed in Fig. 8, may operate within and without the window-openings, and be housed in the pockets, when not in use, and the screen frames so thinly fabricated, of metal, or other suitable material, as to add very slightly to pocket thickness, thus insuring riders' enjoyment and luxurious immunity from the stings, dangers, annoyance, and vexations of insect pests, and any type of screens, means of attachment, detachment, fastening, or operation thereof may be employed without departing from the broad principle of my invention.

In Fig. 10 is shown the same principle of spring suspension as in Fig. 9, substituting band-spring units, 151, 152, and, 153, secured in any suitable manner by one of their ends to the cross-members, 154, and, 155, space for free resilient movement of the body above the enlarged diametered traction-wheels, being thus attained, the springs being likewise suitably secured at each of their other ends to the axle 46.

In Fig. 11 is shown the spring-clamp, 47, and its means of securing a spring, 157, on the extremity of an axle, by the staple-bolts and nuts, 158, and, 159, to the flanged-top, 160, the downwardly extending walls ending in the flanges, 161, and, 162, that form a hollow rectangular open slot, 163, which fits over the square area of the clamp-seat, 44, projecting from the outer extremity of the axle, 46, and is clamped flush thereto by the oscillatable hinged jaw, 164, which is locked to the flange, 165, by the bolt and nut, 166. The spring suspension is thus rigidly secured to the axle, but the removal of the single nut, 166, frees the axle and traction-wheels, while the integrity of the spring suspension with the balance of the vehicle remains intact, and the springs may be "overhung," as disclosed, or "underslung" the axle by reversing the spring-clamp.

In Fig. 12, is shown the end of an axle, 46, provided with the clamp-seat, 44, on its outer extremity, the threaded extension, 167, provided with the threaded tap, 168, that holds the traction-wheel on the ball-bearing spindle, 169, having a hub-shoulder, 170, at its other end, any suitable type of spindle being utilizable.

In Fig. 13 is shown a body, from which the frontal window-framing and doors have been detached and removed with the side and rear window-posts, 80, 81, 82, and, 83 and roofing structure, retained, and the sash, 59, 60, and, 61, in raised position sealing the side and rear window-openings, 99, 100, and, 101, illustrative of another type of conversion of my invention.

In Fig. 14 is shown the body structure, with the back-panel R, having dovetailing edges, or other suitable sealing means, when closed, and provided with hingeable connections, 171, permitting its adjustment to any reclinable position, the open spaces produced aside and atop thereof being covered, sealed, and protected by the attachable-detachable curtain, 172, which is so modeled, shaped, notched, grooved, and provided with series of hooks-and-eyes, as to adjustably close and fit the variety of sizes of openings produced by different angular reclinations of the panel, R. An elongated opening, 173, extends across the rear of the curtain enabling the pusher "sight-ahead" for directive guidance of the vehicle; and openings, 174, and, 175, afford light and sidewise vision therethrough, these curtain openings being provided with transparent coverings, such, for instance, as Du Pont pyralin, or other, suitable material, for which insect excluding wire-netting screen curtains, may be substituted, when insect excluding barriers are used in the window-openings. Tripartite leg-rests, 176, 177, and, 178, hingeably secured at 179 to the seat-rest, 180, are adjustable to any desired reclinable position, and foldable against the vertical seatrest-riser, 181, the leg-rests, 177, and, 178, occupying one side of the body interior, and together with a conformably shaped mattress, 182, having leg-rest extensions, 183, and, 184, provide means by which confirmed invalids, or convalescents, may ride with their heads, bodies, and limbs inclined in any desired comfortable recumbent position while enjoying the pleasures and benefits of "outdoor" transportation. The adjacent opposite interior of the vehicle is provided with the attachable-detachable back-stay, 185, for supporting the back-rest, 186, which is of the same width as the seat-cushion, 187, and leg-rest, 176, this side of the vehicle interior, being thus oppositely provided with most comfortable amplitude of accommodation for an accompanying "attendant" in upright sitting posture. Should the invalid rider desire to change to a sitting posture, the reclining back-panel, R, leg-rests, 177, and, 178, and, the mattress, 182, are instantly adjustable for such conversion of the vehicle; or by removal of the back-stay, 185, the back-rest, 186, and seat cushion, 187, and raising all the leg-rests, 176, 177, and, 178 with equal inclination, and substitutive installation of a mattress, the width of the entire body interior, an invalid rider may recliningly occupy the full width space of the vehicle interior; or by closing the back-panel, R, folding all the leg-rests, 176, 177, and, 178, against the seatrest-riser, 181, and installing a back-rest and seat-cushion the full width of the body interior, the vehicle is again reconverted into a general passenger rolling-chair. The "push-rod-handle" may be modified and elongated to conform with the inclinatory prolongation of the back-panel, R. The leg-rests are also each provided with attachable-detachable-foot-rest extensions, 189, 190, and, 191, securable to the leg-rests, 176, 177, and, 178, by slide-fixtures, or other suitable means.

The flexible mattress, 182, disclosed in Fig. 16 having the divided leg-rest extensions, 183, and, 184, conformable in shape to and adjustable with respective inclinations of the leg-rests, 177, and, 178, seat-rest, 180, and back-panel, 169, is provided with the raised barrier, 192, that outlines its top exterior for preventing the person and limbs of a reclining occupant from "slipping off" the mattress and leg-rests; the eye-stays, 193, fastening the mattress extensions to the leg-rests.

Safety brakes, 194, of the drum-and-band type, applied to the rear-traction wheel-hubs, operable by the bell-crank-levers, 195, 196, and, 197, extend to the operating-control-handle, 198, located proximate the push-handle at the rear of the body, within close arm reach and hand grasp of one another, and provide the "pusher" accessible means of speed control, to hold the vehicle steady during high wind velocities, and when traveling down inclines, thus enabling the "pusher" to bring the vehicle to an instantaneous stop for the avoidance of injuries to the feet, limbs, bodies, and clothing of pedestrians by the frequent accidents of rolling-chairs heretofore devoid of safety devices.

The "isolated" heat-plant, 199, shown in Figs. 4, and, 19, may integrally, or detachably, conform with the floor and body structure and perform the double functions of heater and footstool, and be provided with a grating, 200, and a carpet. Its bottom, 201, sides, 202, and, 203, and central top, 204, are provided with asbestos, or other suitable protective material, the opening, 205, accommodating the tray, 206, which closely fits therein, is withdrawable therefrom, and of dimensions to form a hot-air conduit, 207, around its declinable perforated walls, 208, and, 209, which with the exterior walls, 202, and, 203, of the heat-plant, form the surrounding hot-air conduit, 207, when the fuel tray, 206, is within the opening, 205. The fuel tray, 206, is divided into the compartments, 210, 211, and, 212, of less height than that of the walls, 208, and, 209, which form repositories for the fuel briquets, 213; the open space thereabove forming a hot-air chamber discharging heat through the perforations of the walls, 208, and, 209, into the hot-air conduit, 207, when the tray is in operative position within and closing the opening, 205; and, the perforations, 214, through the surface of the heat-plant over the hot-air conduit, 207, discharge and radiate the heat to warm the vehicle. The fuel is a dry non-explosive compound, made into briquets; lights from a match, consumes steadily without flame, smoke, odor, or giving off gases, and each briquet possessing a given quantity of heat units; the periods and degrees of heat can be regulated by the size and number of briquets placed in the tray, and lighted at one time, thereby securing a safe, efficient, and economic heating system for comfort of passengers during cold weather; while, in warm weather an "insect chaser" can be burned in the tray for a few moments to clear the vehicle of mosquitos, when the insect excluding screens are used, and the tray may, also, be utilized for sanitary fumigation of the vehicle.

In Fig. 24 is shown a modification of the underframe by which the extension, 215, of the side-sill, 216, is upwardly inclined from the foot of the upright, 217, and joined to and with the seat-sill, 218, and rear upright, 219, at their intersection, 220, the member, 221, likewise diagonally inclining in opposite direction from 222, to jointure with the members, 217, and, 218, and either passed around each other at the point, 223, or joined thereat.

In Fig. 25, is shown a similar modification of the underframe, the members, 224, and, 225, equally inclining to the central point, 226, where they join the member, 227, that vertically rises therefrom to its jointure with the seat-rest, sill, 228.

In Fig. 26, is shown an underframe, having modified springs, 229, and, 230, suspended respectively, to the cross-members, 231, and, 232, and axle, 233.

In Fig. 27 is shown an underframe, provided with a different modification of springs, 234, and 235, secured, respectively, to the cross-members, 5, and, 10, of the underframe, and the axle, 236.

In Fig. 28 is shown the portable inclinatory "stretcher" resilient-frame-lounge, 224, provided with the inclinable head-rest section, 245, hingeably secured to the body section, 246, the declinable leg-rest sections, 247, and 248, likewise hingeably secured to the other end of the body-section 246, by means of lock-hinges, 249, said head and leg-rest sections being lockable in horizontal plane with the body section, 246, when transporting a "disabled" person in prostrate position, handholds, 250, 251, 252, and, 253, of suitable type, facilitating lifting and moving; the springs, 254, of suitable resilient material, supporting the mattress, 182. The "stretcher" with all sections locked in horizontal plane, carrying a human load, is passed through the wide and deep opening formed by the reclining back, R, its section, 246, positioned on the seat-rest, 180, and the head and leg-rest sections, 245, 247, and, 248, unlocked, and adjusted to any inclinations desired for comfortably supporting the head and legs of a recumbent occupant. This portable "stretcher" constitutes an ever ready and efficient means of transporting a "disabled" person, and forms a bed-spring upholding the mattress, and a luxuriously comfortable resilient riding lounge, upon which the invalid remains unmolested during the entire journey, including carriage to and from the house, thus, eliminating the heretofore discomforts and annoyances of displacements, handling, and transfers.

While the upper and lower body structures, are shown in Figs. 20, and 23, locked to each other by tubing uprights, 255, and 256, secured by a dowel-pin, 257, and set-screw, 258, any suitably locking means may be employed, and though preferably, it is designed to use plaited India reed for the body walls, 259, and, 260, any other suitable wall covering material, such, for instance, as Du Pont fabricoid, may be utilized, this rolling-chair invention, generally, and specifically, not being limited to any means, methods, arrangements, shapes, employments, illustrations, descriptions, or structures shown, but all essences and characteristics of cause, element, motive, substantiality, derivatives, comprehensions, embodiments, operations, fundamentals, or equivalents, involved in whole, or in part, disclosed or not disclosed, attaining the same, or like objects, or results, may be employed and used without departing from the broad spirit of my invention.

Improved and beautified boardwalks and thoroughfares of seashores, parks, and resorts have so developed rolling-chair transportation that it has become a popular amusement of pleasure seekers, a recreation for invalids and convalescents, and a commercial industry demanding a vehicle possessing the qualificatoins of comfort, convertibility, and efficiency that constitutes this invention a luxury of convenience for those in pursuit of enjoyable pastime, "disabled" persons in quest of fresh-air, sunshine, change of scene, and environment, and proficiency of universal service, operation, and maintenance in the enterprise of such transportative popularized "sport" and commerce.

I claim:

1. A convertible-rolling-chair having traction-wheels upholding a body provided with lengthwise-and-transverse-structure; structure forming the sides and rear of the body; structure forming pockets in the rear and sides of the body adapted to hold closure-structure; a dash forming the front of the body; structure forming a pocket in the dash adapted to hold closure-structure; doorways fitted with door-structure; pocket-forming-structure in the doors-structure adapted to hold closures; seat-structure inclosed by the pocket-forming-structure in the respective dash-rear-sides-and-door structures providing occupants means of unobstructed vision from the seat-structure to and beyond the respective structures of the dash, and fixtures located adjacent the respective pockets-forming-structures adapted for affixing thereto a top upperstructure coöperably registering therewith.

2. A rolling-chair having traction-wheels and a body provided with lengthwise, transverse, upright, seat and back-rest structure; side upright structure having an arm-rest vertex; rear upright structure terminating proximate the vertex of the seat-back structure; dash upright structure having its vertex approximately on a level with the seat-rest structure; doorway openings intermediate the dash and side upright structure; door structure having approximate height of the dash upright structure closing the doorway openings.

3. A convertible-rolling-chair having traction-wheels upholding a body provided with rear-and-sides-structure; structure forming pockets therein adapted to hold closure-structure; sill-structure crowning the pockets-forming-structure provided with apertures adapted for the passage of closure-structure therethrough; a dash forming the forward extremity of the body-structure; structure forming pockets in the dash adapted to hold closure-structure; sill-structure crowning the structure forming pockets in the dash provided with apertures adapted for the passage of closure-structure therethrough; doorways fitted with door structure provided with structure forming pockets adapted to hold closure-structure; sill-structure crowning the pocket-forming-structure of the door-structure provided with apertures adapted for the passage of closure-structure therethrough, and seat-structure forming the seating capacity of the rolling-chair confined within the area of the pockets-forming-structure.

4. A rolling-chair having traction-wheels and a body provided with foundational structure; side and rear vertical structure; front vertical structure; doorway openings intermediate the front and side vertical structure; seat structure protruding into the doorway openings, and door structure fitting the doorway openings projecting in extent beyond the protrusion of the seat structure.

5. A rolling-chair having traction-wheels and a body provided with foundational structure; upright structure provided with ingress-egress openings therethrough; seat structure projecting into the ingress-egress openings thereby providing enlarged area within the seat structure; and enlarged diametered traction-wheels within the enlarged area of the seat structure.

6. A rolling-chair having traction-wheels and a body provided with foundational structure; side and rear upright structure provided with means adapted to hold closures; front vertical structure provided with means adapted to hold closures; doorway openings intermediate the front and side vertical structure; seat structure adjacent the side and rear vertical structure protruding into the doorway openings thereby providing enlarged area within the seat structure; traction-wheels of enlarged diameter within the enlarged seat structure area, and door structure fitting the doorway openings projecting in extent beyond the protrusion of the seat structure provided with means adapted to hold closures.

7. A rolling-chair having traction-wheels and a body provided with foundational structure; side and rear upright structure provided with means adapted to hold closures; seat structure adjacent the side and rear upright structure; front upright structure having its vertex approximately at the height of the seat-rest provided with means adapted to hold a plurality of closures; doorway openings intermediate the front and side upright structure; door structure fitting the doorway openings provided with means adapted to hold a plurality of closures having approximately the same vertical dimensions of the front upright structure.

8. A rolling-chair having traction-wheels and a body provided with foundational structure; side and rear upright structure provided with means adapted to hold closures; seat structure; dash structure having its vertex approximately at a horizontal level with the seat-rest provided with means adapted to hold a plurality of closures each having approximate upright dimensions of the dash structure; doorway openings intermediate the dash and side upright structure; door structure fitting the doorway openings provided with means adapted to hold a plurality of closures having approximate upright dimensions of the dash structure.

9. A rolling-chair having traction-wheels upholding a body provided with a floor-and-rear-and-side-upright-structure, and a forwardly converging - dash - structure having pocket - forming - structure therein and a rounded exterior conformation on the arc of a circle inclosing said dash-structure.

10. A rolling-chair having traction-wheels and a body provided with underframing of integrally united lengthwise-and-transverse-base-sill-members extending in rigid continuity forming the basic foundational supporting structure of the body; upright-members integrally united with the base-sill-members and upper transverse framing structure integrally mounted on certain of said uprights, and said foundational structure converging beyond the latter upright-members to a central peak.

11. A convertible - rolling - chair having traction-wheels upholding a body provided with a framing of integrally united sill-members extending in lengthwise and transverse rigid continuity forming the basic foundational-structure of the body; upright-and - transverse - members united with the basic-sill-members forming the rear-sides-seat-and-dash-framing-structure; structure forming pockets adapted to hold closure-structure united with the rear-sides-and-dash-framing-structure, and door-structure provided with pocket - forming - structure adapted to hold closure-structure hinged to the body-structure.

12. A rolling-chair having traction-wheels and a body provided with foundational-and-upright-structure; spring-suspension upheld by the traction-wheels for supporting the body, said spring-suspension located in extreme outward proximity of the sides foundational structure relative with free resilient movement of the body adapted for reduction of swaying-rocking motion of the body.

13. A rolling-chair having traction-wheels upholding spring-suspension located outside the vertical planes of the traction-wheels-"tread," and a body supported by the spring-suspension at maximum proximity of the body outlines, whereby the distance between the spring-suspension "tread" is greater than the distance between the traction-wheel "tread."

14. A rolling-chair having front and rear traction-means; a chassis attached to the front traction-means extending rearwardly unattached to the rear traction - means; spring - suspension adjacent the front traction-means; spring-suspension adjacent the rear traction-means, and a body upheld by the front and rear spring-suspension, whereby the front traction-means provides the fulcrum of the arc of the circle through which the chassis and body coöperatively resiliently move.

15. A rolling-chair having traction-wheels provided with an axle; spring - supports proximate the axle extremities; spring - fixtures attached to the spring - supports; springs attached to the spring-fixtures; traction-wheel supports adjacent the spring-supports; traction-wheels on the traction-wheel supports; a body upheld by the springs, and means detaching the spring-fixtures from the spring-supports, whereby the traction-wheels are disjoinable from the rolling-chair, provided with spring-suspension outside the vertical planes of the traction-wheels extended.

16. A rolling-chair having three traction-wheels and a body provided with pockets adapted to hold closures movable to and from the pockets; means moving - guiding the traction-wheels, and springs supporting the body proximate the extremities of the vertical planes of the body side outlines extended.

17. A rolling-chair having traction-wheels upholding a body provided with foundational - and - upright - structure; a pushing-guiding-mechanism provided with extension rigidly attached approximate the top of the rear-upright-structure of the body; an operating - handle movable to different locations of the extension of the pushing-guiding-mechanism, and means for holding the operating - handle at different locations of the extension of the pushing-guiding-mechanism for accommodating the different lengths of arm-reach of persons of respective different heights of stature operating the rolling-chair.

18. A rolling-chair having front and rear traction-means; means extending from fulcrum with the front traction-means for pushing and guiding the vehicle from the rear; spring-suspension upheld by the traction-means supporting a body, and flexible means connecting the pushing-guiding means with the traction-means whereby pushing force exerted upon the pushing-guiding means imparts pulling-force to both the front and rear traction-means to pull the rolling-chair.

19. A rolling-chair having traction-wheels and a body provided with lengthwise and upright-structure; a movable-section of the upright-structure adapted to be extended forming an opening in the body; an upholding-structure stretching across the width of the body adapted to support a combined couch and seat, said couch having hinged-sections adjustable in different planes with respect to each other on the upholding-structure, said movable-section forming a back for the couch, the said seat having a fixed back against which the movable-section abuts in folded position, whereby the couch is adapted to support an occupant in recumbent-attitude while the seat is adapted to support an occupant in upright sitting-posture.

20. A rolling-chair having front and rear traction-means and a body provided with lengthwise, transverse, and upright structure; a chassis-pushing-guiding-mechanism extending rearward of the body measuring greater distance across its front transverse plane than across its rear transverse plane, and means at the rearward extension of the chassis-pushing-guiding-mechanism for translating and guiding the rolling-chair, whereby the front expanse of the chassis-pushing-guiding mechanism provides maximum means of expedition and facility in translating and guiding the vehicle.

21. A rolling-chair having a body; traction-wheels having enlarged diameters relative with the dimensions of the body; a pushing-guiding-mechanism for operating the rolling-chair, said pushing-guiding-mechanism having its forward sector downwardly bowed forming a wheel-port thereof, said wheel-port adapted to accommodate an enlarged-diametered-traction-wheel within its radius; spring-suspension attached to the downward bows of the pushing-guiding-mechanism adapted to support the body at maximum proximity to the roadway relative with an enlarged-diametered-traction-wheel functioning within the wheel-port.

22. A rolling-chair having front and rear-traction-means and a body; pushing-guiding-mechanism upheld by the front-traction-means and the body; spring-suspension upheld by the pushing-guiding-mechanism for supporting the body at the front thereof; an axle upheld by the rear-traction-means, and spring-suspension upheld by the axle for rearwardly supporting the body, whereby the body freely flexes on the respective spring-suspensions upheld by the axle, and by the said pushing-guiding-mechanism-respectively.

In testimony whereof I have hereunto signed my name this twenty-fifth day of November, A. D. 1919.

CHARLES BREWSTER STEELE.

Witness:
EMANUEL A. RICH.